United States Patent
Mason et al.

(10) Patent No.: US 8,521,752 B2
(45) Date of Patent: Aug. 27, 2013

(54) SYSTEMS AND METHODS FOR ARBITRARY DATA TRANSFORMATIONS

(75) Inventors: W. Anthony Mason, Milford, NH (US); Peter G. Viscarola, Mont Vernon, NH (US); Mark J. Cariddi, Merrimack, NH (US); Scott J. Noone, Nashua, NH (US)

(73) Assignee: OSR Open Systems Resources, Inc., Amherst, NH (US)

( * ) Notice: Subject to any disclaimer, the term of this patent is extended or adjusted under 35 U.S.C. 154(b) by 1282 days.

(21) Appl. No.: 11/145,433

(22) Filed: Jun. 3, 2005

(65) Prior Publication Data

US 2006/0277153 A1 Dec. 7, 2006

(51) Int. Cl.
*G06F 7/00* (2006.01)

(52) U.S. Cl.
USPC .......................................... 707/756

(58) Field of Classification Search
USPC ................. 707/100, 101–104, 1–3, 756, 809, 707/602, 999.107
See application file for complete search history.

(56) References Cited

U.S. PATENT DOCUMENTS

| | | | |
|---|---|---|---|
| 4,135,240 A | | 1/1979 | Ritchie |
| 4,959,811 A * | | 9/1990 | Szczepanek .................... 365/49 |
| 4,984,153 A | | 1/1991 | Kregness et al. |
| 5,027,395 A | | 6/1991 | Anderson et al. |
| 5,488,701 A * | | 1/1996 | Brady et al. ....................... 714/6 |
| 5,506,983 A * | | 4/1996 | Atkinson et al. ................. 707/1 |
| 5,530,850 A * | | 6/1996 | Ford et al. ..................... 707/206 |
| 5,537,588 A * | | 7/1996 | Engelmann et al. .......... 707/202 |
| 5,551,003 A | | 8/1996 | Mattson et al. |
| 5,574,898 A | | 11/1996 | Leblang et al. |
| 5,606,983 A * | | 3/1997 | Monty et al. ................... 132/229 |
| 5,652,879 A * | | 7/1997 | Harris et al. ................... 707/101 |
| 5,664,178 A * | | 9/1997 | Sinofsky ....................... 707/100 |
| 5,706,504 A | | 1/1998 | Atkinson et al. |
| 5,715,441 A | | 2/1998 | Atkinson et al. |
| 5,734,861 A | | 3/1998 | Cohn et al. |
| 5,752,252 A | | 5/1998 | Zbikowski et al. |
| 5,757,915 A | | 5/1998 | Aucsmith et al. |
| 5,764,880 A | | 6/1998 | Gerdt et al. |
| 5,781,797 A | | 7/1998 | Crick et al. |
| 5,799,324 A | | 8/1998 | McNutt et al. |
| 5,802,344 A | | 9/1998 | Menon et al. |
| 5,815,707 A | | 9/1998 | Krause et al. |

(Continued)

FOREIGN PATENT DOCUMENTS

| | | |
|---|---|---|
| EP | 1320010 A2 | 6/2003 |
| WO | WO 2006/081508 A1 | 8/2006 |

OTHER PUBLICATIONS

Mendel Rosenblum & John K. Ousterhout, "The Design and Implementation of a Log-Structured File System," *ACM Transactions on Computer Systems*, vol. 10, No. 1, p. 26-52, Feb. 1992.

(Continued)

*Primary Examiner* — Mohammed R Uddin
(74) *Attorney, Agent, or Firm* — K&L Gates LLP

(57) ABSTRACT

Methods for organizing data. The methods may comprise the step of receiving a write request comprising a data unit. The methods may also comprise the steps of organizing the data unit into a sub-file and incorporating the sub-file into a data file according to a log-structured organization system. In addition, the methods may include the step of writing the data file to a data storage according to a second organization system.

20 Claims, 7 Drawing Sheets

(56) References Cited

U.S. PATENT DOCUMENTS

| | | | |
|---|---|---|---|
| 5,832,515 A * | 11/1998 | Ledain et al. | 707/202 |
| 5,857,207 A * | 1/1999 | Lo et al. | 707/203 |
| 5,873,097 A * | 2/1999 | Harris et al. | 707/203 |
| 5,923,878 A | 7/1999 | Marsland | |
| 5,991,893 A | 11/1999 | Sinder | |
| 5,996,054 A * | 11/1999 | Ledain et al. | 711/203 |
| 6,006,227 A * | 12/1999 | Freeman et al. | 707/7 |
| 6,021,408 A * | 2/2000 | Ledain et al. | 707/8 |
| 6,021,509 A | 2/2000 | Gerdt et al. | |
| 6,038,668 A * | 3/2000 | Chipman et al. | 726/30 |
| 6,065,100 A * | 5/2000 | Schafer et al. | 711/137 |
| 6,079,047 A | 6/2000 | Cotugno et al. | |
| 6,101,186 A * | 8/2000 | Craig | 370/394 |
| 6,108,420 A | 8/2000 | Larose et al. | |
| 6,128,630 A | 10/2000 | Shakelford | |
| 6,148,368 A | 11/2000 | DeKoning | |
| 6,240,527 B1 * | 5/2001 | Schneider et al. | 714/21 |
| 6,260,036 B1 * | 7/2001 | Almasi et al. | 707/2 |
| 6,321,239 B1 | 11/2001 | Shakelford | |
| 6,336,164 B1 | 1/2002 | Gerdt et al. | |
| 6,347,397 B1 | 2/2002 | Curtis | |
| 6,366,987 B1 * | 4/2002 | Tzelnic et al. | 711/162 |
| 6,367,008 B1 | 4/2002 | Rollins | |
| 6,377,958 B1 * | 4/2002 | Orcutt | 707/200 |
| 6,381,682 B2 | 4/2002 | Noel et al. | |
| 6,418,509 B1 * | 7/2002 | Yanai et al. | 711/112 |
| 6,430,548 B1 * | 8/2002 | Deis et al. | 707/2 |
| 6,438,594 B1 | 8/2002 | Bowman-Amuah | |
| 6,449,688 B1 | 9/2002 | Peters et al. | |
| 6,490,664 B1 | 12/2002 | Jones et al. | |
| 6,526,570 B1 | 2/2003 | Click, Jr. et al. | |
| 6,529,909 B1 * | 3/2003 | Bowman-Amuah | 707/10 |
| 6,535,949 B1 * | 3/2003 | Parker | 711/103 |
| 6,577,254 B2 | 6/2003 | Rasmussen | |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,625,671 B1 | 9/2003 | Collette et al. | |
| 6,628,411 B2 | 9/2003 | Miller et al. | |
| 6,633,244 B2 | 10/2003 | Avery et al. | |
| 6,643,405 B1 | 11/2003 | Sako | |
| 6,654,851 B1 | 11/2003 | McKean | |
| 6,657,565 B2 | 12/2003 | Kampf | |
| 6,664,903 B2 | 12/2003 | Kugai | |
| 6,704,839 B2 | 3/2004 | Butterworth et al. | |
| 6,711,709 B1 | 3/2004 | York | |
| 6,732,125 B1 | 5/2004 | Autrey et al. | |
| 6,738,863 B2 | 5/2004 | Butterworth et al. | |
| 6,741,747 B1 | 5/2004 | Burns et al. | |
| 6,775,781 B1 | 8/2004 | Phillips et al. | |
| 6,782,319 B1 * | 8/2004 | McDonough | 701/208 |
| 6,785,768 B2 | 8/2004 | Peters et al. | |
| 6,795,640 B1 | 9/2004 | Honda | |
| 6,795,897 B2 | 9/2004 | Benveniste et al. | |
| 6,847,681 B2 | 1/2005 | Saunders et al. | |
| 6,856,993 B1 | 2/2005 | Verma et al. | |
| 6,901,403 B1 * | 5/2005 | Bata et al. | 707/101 |
| 6,944,619 B2 * | 9/2005 | Gruenwald | 707/101 |
| 6,947,556 B1 | 9/2005 | Matyas, Jr. et al. | |
| 6,983,456 B2 | 1/2006 | Poznanovic et al. | |
| 7,051,031 B2 | 5/2006 | Schein | |
| 7,088,823 B2 | 8/2006 | Fetkovich | |
| 7,100,047 B2 | 8/2006 | Stamos et al. | |
| 7,107,267 B2 | 9/2006 | Taylor | |
| 7,146,009 B2 | 12/2006 | Andivahis et al. | |
| 7,225,333 B2 | 5/2007 | Peinado et al. | |
| 7,340,581 B2 * | 3/2008 | Gorobets et al. | 711/202 |
| 7,370,319 B2 | 5/2008 | Pensak et al. | |
| 7,392,383 B2 | 6/2008 | Basibes et al. | |
| 7,444,625 B2 | 10/2008 | Anwar et al. | |
| 7,487,363 B2 | 2/2009 | Alve et al. | |
| 7,502,713 B2 | 3/2009 | Hillier et al. | |
| 7,523,221 B2 * | 4/2009 | Hillberg et al. | 709/246 |
| 7,530,016 B2 | 5/2009 | Sahota et al. | |
| 7,536,418 B2 | 5/2009 | Buchsbaum et al. | |
| 7,546,221 B2 | 6/2009 | Moon et al. | |
| 7,549,174 B1 | 6/2009 | Falkner et al. | |
| 7,702,995 B2 | 4/2010 | Sahota et al. | |
| 7,783,765 B2 | 8/2010 | Hildebrand et al. | |
| 7,802,082 B2 | 9/2010 | Kruse et al. | |
| 7,805,755 B2 | 9/2010 | Brown et al. | |
| 7,809,897 B1 | 10/2010 | Mason et al. | |
| 7,823,210 B2 | 10/2010 | Bessonov et al. | |
| 7,930,756 B1 | 4/2011 | Crocker et al. | |
| 7,949,693 B1 | 5/2011 | Manson et al. | |
| 2002/0004793 A1 * | 1/2002 | Keith, Jr. | 707/1 |
| 2002/0052868 A1 * | 5/2002 | Mohindra et al. | 707/1 |
| 2002/0073066 A1 * | 6/2002 | Coutts et al. | 707/1 |
| 2002/0073236 A1 * | 6/2002 | Helgeson et al. | 709/246 |
| 2002/0095421 A1 * | 7/2002 | Koskas | 707/100 |
| 2002/0143735 A1 * | 10/2002 | Ayi et al. | 707/1 |
| 2003/0110478 A1 | 6/2003 | Duesterwald et al. | |
| 2003/0123446 A1 * | 7/2003 | Muirhead et al. | 370/392 |
| 2004/0015958 A1 | 1/2004 | Veil et al. | |
| 2004/0167916 A1 * | 8/2004 | Basso et al. | 707/100 |
| 2004/0186920 A1 * | 9/2004 | Birdwell et al. | 710/1 |
| 2004/0250247 A1 | 12/2004 | Deeths et al. | |
| 2005/0114356 A1 * | 5/2005 | Bhatti | 707/100 |
| 2005/0144189 A1 * | 6/2005 | Edwards et al. | 707/102 |
| 2005/0240966 A1 * | 10/2005 | Hindle et al. | 725/45 |
| 2006/0031246 A1 * | 2/2006 | Grayson | 707/102 |
| 2006/0070076 A1 | 3/2006 | Ma | |
| 2006/0101025 A1 * | 5/2006 | Tichy et al. | 707/100 |
| 2006/0123250 A1 * | 6/2006 | Maheshwari et al. | 713/193 |
| 2006/0190417 A1 | 8/2006 | Hilkemeyer et al. | |
| 2006/0195476 A1 | 8/2006 | Nori et al. | |
| 2006/0277153 A1 * | 12/2006 | Mason et al. | 707/1 |
| 2008/0134154 A1 | 6/2008 | Patel et al. | |
| 2009/0249277 A1 | 10/2009 | Prakash | |

OTHER PUBLICATIONS

Michael Burrows, Charles Jerian, Butler Lampson, & Timothy Mann, "On-line Data Compression in a Log-structured File System," proceedings of the *Fifth International Conference on Architectural Support for Programming Languages and Operating Systems*, p. 12-15, ACM Press, Oct. 1992.

U.S. Appl. No. 11/505,582, filed Aug. 17, 2006.

U.S. Appl. No. 11/509,391, filed Aug. 24, 2006.

U.S. Appl. No. 11/844,102, filed Aug. 23, 2007.

U.S. Appl. No. 11/789,147, filed Apr. 24, 2007.

"Windows Streams—An Introduction to File System Streams," printed from http://www.osronline.com, The NT Insider, vol. 13, Issue 2, Mar.-Apr. 17, 2006, 6 pages.

"Sponsor Sessions," printed from http://microsoft.com/whdc/driverdevcon/ddctracks2005/d05_sponsors.mspx, updated Mar. 25, 2005, printed Apr. 25, 2006, 2 pages.

"Windows Driver Devcon 2005; Practical Challenges in Implementing Encryption/Compression Filters," Microsoft Windows Hardware & Driver Central, Microsoft Corporation, 2005, 21 pages.

Office Action issued on Sep. 8, 2008 in U.S. Appl. No. 11/505,582.

Notice of Allowability issued on Dec. 17, 2008 in U.S. Appl. No. 11/505,582.

Mac OS X ABI Mach-O File Format Reference, Oct. 3, 2006, 62 pages.

Duncan, Geoff, "Man Buys Used iPod with U.S. Troop Data", Jan. 27, 2009, printed from http://digitaltrends.com/international/man-buys-used-ipod-with-us-troop-data/ (1 page).

Office Action issued on Dec. 8, 2009 in U.S. Appl. No. 11/509,391.

Office Action issued on Jul. 12, 2010 in U.S. Appl. No. 11/509,391.

Office Action issued on Feb. 23, 2011 in U.S. Appl. No. 11/509,391.

Office Action issued on Aug. 26, 2011 in U.S. Appl. No. 11/509,391.

Office Action issued on Dec. 19, 2012 in U.S. Appl. No. 11/509,391.

Office Action issued on Mar. 30, 2010 in U.S. Appl. No. 11/789,147.

Office Action issued on Feb. 3, 2011 in U.S. Appl. No. 11/789,147.

Notice of Allowance mailed May 26, 2011 in U.S. Appl. No. 11/789,147.

Office Action issued on Mar. 2, 2010 in U.S. Appl. No. 11/844,102.

Notice of Allowance mailed Sep. 16, 2010 in U.S. Appl. No. 11/844,102.

Notice of Allowance mailed Jan. 20, 2011 in U.S. Appl. No. 11/844,102.
Notice of Abandonment under 37 CFR 1.53(f) or (g) mailed Oct. 11, 2011 in U.S. Appl. No. 12/985,923.
Office Action issued on Dec. 15, 2009 in U.S. Appl. No. 12/388,712.
Office Action issued on May 20, 2010 in U.S. Appl. No. 12/388,712.
Notice of Allowance mailed Jul. 1, 2010 in U.S. Appl. No. 12/388,712.

* cited by examiner

SYSTEMS AND METHODS FOR ARBITRARY DATA TRANSFORMATIONS

BACKGROUND

Modern computer operating systems include one or more file system components. Such components are responsible for storing, organizing, updating, and retrieving data for normal application programs in a manner that is largely transparent to the user of the computer applications running on a computer system employing such an operating system. The specific features supported by these file systems can vary dramatically, both in terms of their model of organization, the manner in which they communicate with their underlying storage, and the specific features they make available to application programs, and thus, ultimately, to the users of those application programs.

Some file systems support specialized data transformation features, such as encryption, compression, storage of multiple disjoint data attributes (such as streams, resource forks, property lists, extended attributes, etc.), transactional support, localized language support, etc. However, these features are characteristics of the specific file system, and different machines in a computer system may use different file systems. Accordingly, applications running on the computer system are unable to take advantage of these specialized features unless all components of the computer system use the same file system. Applications may individually support such features by incorporating their own unique features but this technique does not make the features available to existing applications, limiting overall usefulness.

SUMMARY

According to one aspect of the present disclosure, embodiments of methods for organizing data are disclosed. The methods may comprise the step of receiving a write request comprising a data unit. The methods may also comprise the steps of organizing the data unit into a sub-file and incorporating the sub-file into a data file according to a log-structured organization system. In addition, the methods may comprise the step of writing the data file to a data storage according to a second organization system.

According to another aspect of the present disclosure, embodiments of a system for organizing data are disclosed. The system may comprise an application, a data storage, and a data transformation module. The data transformation module may be configured to receive a write request from the application. The write request may comprise a data unit. The data transformation module may also be configured to organize the data unit into a sub-file and incorporate the sub-file into a file according to a log-structured organization system. In addition, the data transformation module may be configured to forward the file to the data storage.

DESCRIPTION

Various embodiments of the present invention may be employed to perform arbitrary data transformations. As used herein, the term "data unit" refers to a group of related data. As used herein, the term "data file" refers to an organizational unit of data. For example, a data file may include one or more data units. In various non-limiting embodiments, a data file may be an application data file, a database record or a file containing some or all of an executable image, such as an application program, code library, device driver, operating system image file, etc. As used herein, the term "sub-file" refers to an organizational unit of data organized within a data file. For example, a sub-file may include one or more data units.

Figure 1:
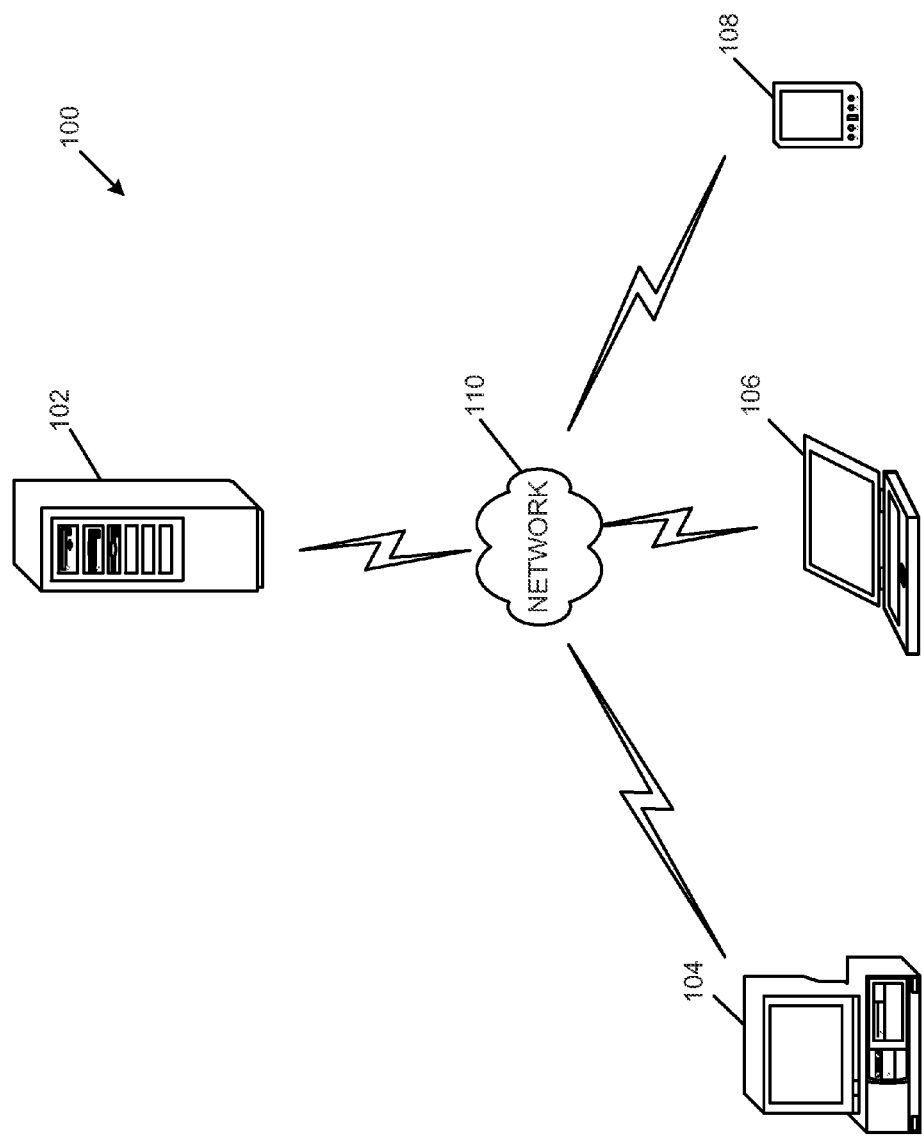
FIG. 1 shows a schematic representation of a computer network according to various embodiments.

FIG. 1 shows a computer system 100 that may be used to implement various embodiments of the present invention. The computer system 100 may include various computing devices including a server 102, a personal computer 104, a laptop 106, and a portable and/or handheld computer 108. The computing devices 102, 104, 106, 108 may each include hardware components such as, for example, processor(s), cache memory, random access memory (RAM), read only memory (ROM), data storage, etc. A network 110 may provide connectivity between the devices 102, 104, 106, 108 according to any suitable wired or wireless method. In various embodiments, the computer system 100 may include more devices than are shown in FIG. 1, including multiple examples of the devices 102, 104, 106, 108. The devices 102, 104, 106, 108 may include various software components including, for example, word processing software, e-mail software, etc.

Figure 2:
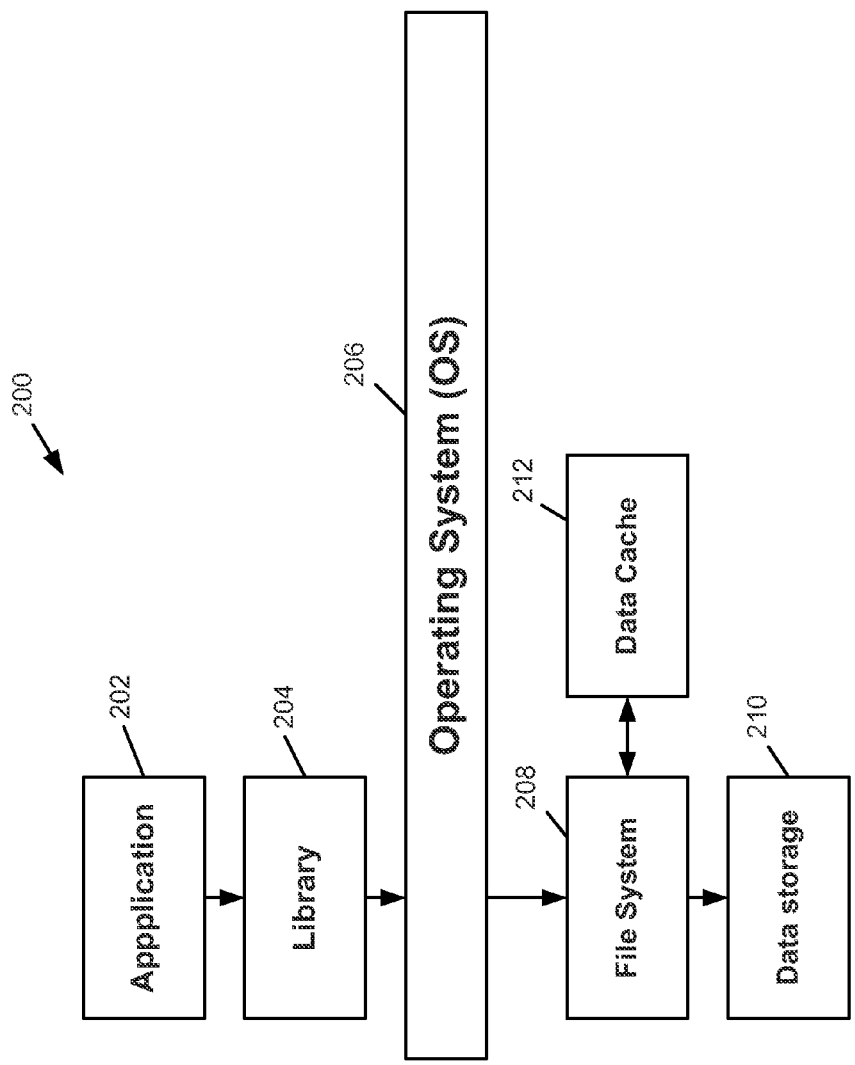
FIG. 2 shows a block diagram of a system architecture according to various embodiments.

FIG. 2 shows a block diagram of a system architecture 200 that may be used to implement various embodiments of the present invention. The components of the architecture 200 may be implemented as software code, for example to be executed by a processor(s) of one or more of the computing devices 102, 104, 106, 108 using any type of suitable computer instruction type, such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium, such as a hard drive or floppy disk, an optical medium such as a CD or DVD-ROM or a flash memory card. In various embodiments, one or more components of the architecture 200, e.g., data storage 210, may be implemented as one or more hardware components.

The system architecture 200 may include one or more examples of an application 202, a library 204, an operating system 206, a file system 208, data storage 210 and a data cache 212. The various components of the architecture may facilitate the transfer of data between data storage 210 and the application 202. The architecture 200, in various embodiments, may be implemented on one or more of computing devices 102, 104, 106, 108. It will be appreciated that instances of some components of the architecture 200 such as, for example, the operating system 206, may occur on more than one of the computing devices 102, 104, 106, 108. Other components such as, for example, data storage 210 may be implemented across multiple components 102, 104, 106, 108 of the computer system 100.

The application 202 may include a group of one or more software components executed by a processor or processors of one or more of the devices 102, 104, 106, 108. The application 202 may perform at least one useful task such as, for example, providing e-mail service, providing word processing, providing financial management services, etc. The application 202 may perform tasks by manipulating data. To acquire data for manipulation and output results, the application 202 may create "read requests" and "write requests" for particular data units. These requests may be handled by other components of the architecture 202 as described in more detail below. It will be appreciated that the architecture 200 may, in various aspects, include additional applications (not shown).

Data utilized by the application 202 may be stored at data storage 210. Data storage 210 may include any kind of storage drive capable of storing data in an electronic or other suitable computer-readable format. In certain non-limiting embodiments, data storage 210 may include a single fixed disk drive, an array of disk drives, an array of disk drives combined to provide the appearance of a larger, single disk drive, a solid state drive, etc. Data storage 210 may be physically located at any device 102, 104, 106, 108 of the computer system 100. For example, data storage 210 may include various drives accessible over the network 110. In various embodiments, all or a part of data storage 210 may be located at server 102 and may be accessed by the other components 104, 106, 108 of the computer system 100 through network 110.

File system 208 may be an organization system for logically and physically organizing data present at the data storage 210. In various non-limiting embodiments, the file system 208 may be a native file system included with the operating system 206, described below, or a third party file system. The file system 208 may organize data units into data files, and manage the location of data files in data storage 210. Each data file may include one or more data units. The file system 208 may be, for example, specific to a computer device 102, 104, 106, 108, or to particular drives making up data storage 210. In various embodiments, a single file system 208 may manage associations between data files and physical locations for data storage 210 located across the computer system 100. The file system 208 may be any suitable file system including, as non-limiting examples, File Allocation Table 16 (FAT16), File Allocation Table 32 (FAT32), NTFS, High Performance File System (HPFS), UNIX file system (UFS), XFS, journaled file system (JFS), Universal Data Format File System (UDFS), CD-ROM File System (CDFS), Enhanced File System (EFS), SGI XFS, Clustered XFS (CXFS), HFS, VxFS, Raw File System (RawFS), Local File System (DCE/LFS), etc.

Interaction between the application 202 and the data storage 210 may be facilitated by the operating system 206. The operating system 206 may be any suitable operating system. For example, in various non-limiting embodiments, the operating system 206 may be any version of MICROSOFT WINDOWS, any UNIX operating system, any Linux operating system, OS/2, any version of Mac OS, etc. Each computer device 102, 104, 106, 108 may run its own instance of an operating system 206. The devices 102, 104, 106, 108 of the computer system 100 may in various embodiments run the same type of operating system 206 or different types.

The operating system 206 may provide services to the application 202 that facilitate the application's 202 functions. For example, the operating system 206 may allow the application 202 to access and manipulate data units stored at data storage 210. The operating system 206 may service read or write requests from the application 202, for example, by accessing local or remote data storage 210 through the file system 208. In various embodiments, a library 204 such as, for example, an Application Program Interface (API) library, may be provided at a logical position between the application 202 and the operating system 206. The library 204 may facilitate requests from the application 202 to the operating system 206.

The architecture 200 may also include data cache 212. Data cache 212 may be a location where data or data units may be stored for quick retrieval. In various embodiments, data cache 212 may include dedicated physical memory, for example, associated with a processor or processors of one of the computer devices 102, 104, 106, 108. In other non-limiting embodiments, data cache 212 may include "virtual" cache, e.g. locations in system memory that are considered to be data cache 212.

Data cache 212 may be used as a data buffer to minimize potentially time-consuming instances of accessing data storage 210. For example, the operating system 206 may store data units that have been recently accessed by application 202, or are expected to be accessed by the application 202, in data cache 212. This may be referred to as "read ahead." Also, the operating system 206 may store data units modified by the application 202 in data cache 212, only writing the data units to data storage 210 at certain intervals. This may be referred to as "write behind." In write behind, data units stored in data cache 212 may be written to data storage 210, for example, when the amount of data to be written exceeds a threshold size.

Figure 3:
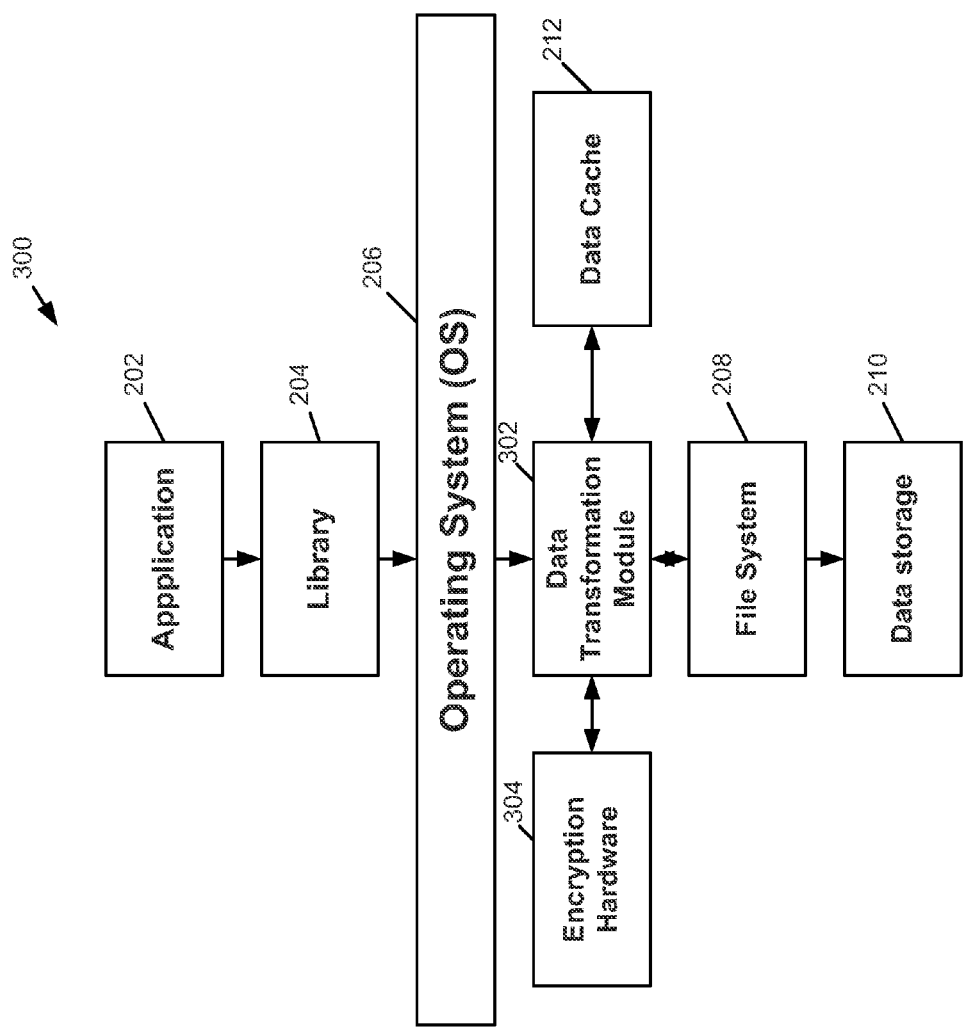
FIG. 3 shows a block diagram of a system architecture according to various embodiments.

FIG. 3 shows a block diagram of a system architecture 300 that may be used to implement various embodiments of the present invention. The architecture 300 may have components in common with the architecture 200, and may additionally include data transformation module 302. Data transformation module 302 may be logically positioned to perform transformations on data being transferred between the operating system 206 and the file system 208, for example, to improve security and storage capacity. As non-limiting examples, the data transformation module 302 may encrypt/decrypt data, compress/decompress data, etc. Because of its position in the architecture 300 below the application 202, the operations of the data transformation module 302 may be transparent to the application 202.

The data transformation module 302 may facilitate transformations of data by manipulating the data's file structure. In various embodiments, the data transformation module 302 may organize data files of the file system 208 to include a series of sub-files. In a MICROSOFT WINDOWS environment, this concept may be called a "file system filter driver;" in a UNIX/Linux environment, it may be called a "layered" or "stackable" file system; and in MICROSOFT DISK OPERATING SYSTEM (MS-DOS), it may be called an INT21 or INT13 driver. The data transformation module 302 may organize sub-files within a data file according to any suitable organization system or file system. In one non-limiting embodiment, the data transformation module 302 may organize the sub-files according to a log-structured organization system, or file system.

Figure 4:
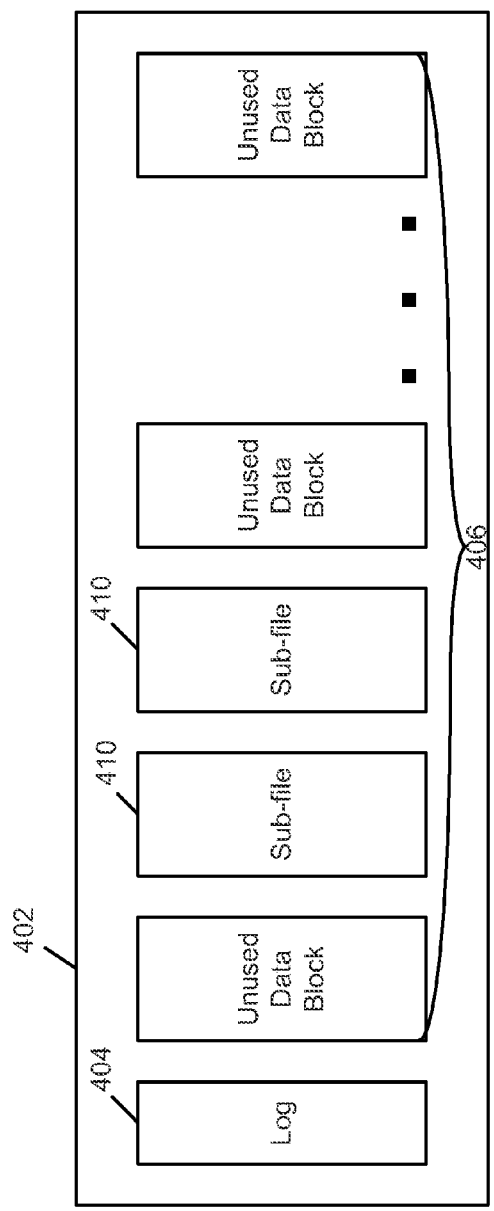
FIG. 4 shows a block diagram of a data file according to various embodiments.

FIG. 4 shows a block diagram of a data file 402 including data blocks 406 for storing sub-files 410 according to a log-structured organization system. Each data block 406 may be capable of housing a sub-file 410 according to various embodiments. Data blocks 406 may be of the same physical size, or in various embodiments, different data blocks 406 may be of different physical sizes. Log 404, included in data file 402, may store the location of each sub-file 410 within the data file 402, e.g., an identifier of the data block or blocks 406 containing the sub-file 410. Upon receiving a request to access a data unit included in a particular sub-file 410, the data transformation module 302 may find the location of the sub-file 410 within the data file 402 by referring to the log 404. Upon receiving a write request, e.g., a request to save a data unit included in a particular sub-file 410, the data transformation module 302 may write the sub-file 410 to an unused data block 406 and update the location of the sub-file 410 in the log 404.

It will be appreciated that organizing sub-files 410 within the data file 402 according to a log-structured organization system may present certain advantages related to data transformation. For example, log-structured organization systems may more easily facilitate data transformations that arbitrarily change the size of a data unit. This is because, in various embodiments, according to a log-structured organization system, when a sub-file 410 is modified, it is written to the next available data block 406 and not to the data block 406 where the sub-file 410 was located before it was modified. Accordingly, log-structured organization systems may more easily handle fluctuations in the size of sub-files 410. Non-limiting examples of arbitrary size-altering data transformations include, for example, transformations to decrease the level of redundancy present within the data file 402, (e.g., compression), transformations to protect the data from being usable without appropriate authorization, (e.g., encryption), translations from a first language to a second language, (e.g., English to Chinese), transformation from a first data format or encoding to a second data format or encoding, (e.g. ASCII data to UNICODE data), etc.

In addition, a log-structured organization system may facilitate the provision of specialized file structure support not present in the underlying file system 208 including, for example, streams, property lists, extended attributes, reparse points, symbolic links, hard links, property lists, resource forks, sparse data regions, etc. For example, a log-structured organization system may facilitate the inclusion of multiple data units with a single sub-file 410 regardless of whether the underlying file system 208 supports this feature. For example, if two data units are associated with a single sub-file 410, then the log 404 may simply be updated to reflect the data blocks 406 corresponding to both data units. This feature may be useful in a number of settings. For example, when a data unit is encrypted, an encryption header may be associated with the same sub-file 410 as the data unit. Also, a data unit including an image may be associated with a second data unit including a thumbnail of the image. In various non-limiting embodiments, any kind of metadata and/or other supplemental data may be associated with a data unit including, for example, a checksum, information indexing the data unit, a translation of the data into a second language, a digital signature authenticating the data unit, etc.

Also, in various embodiments, a data transformation module 302 implementing a log-structured organization or file system may be used to keep previous copies of data units that have been deleted or changed, for example, documents, e-mails, etc. When an application 202 modifies the data unit contained in a sub-file 410, the sub-file 410 may be extracted from the data file 402, modified, and then re-written to the data file 402. According to a log-structured organization system, the sub-file 410 may not be re-written to the previous location or data block 406 from which it was extracted. Instead, the sub-file 410 may be written to a new data location, e.g., a new data block 406. The previous location, however, may not be physically erased and may still store the unmodified version of the sub-file 410. Therefore, records of previous versions of the data unit stored at a sub-file 410 may be maintained by tracking the previous locations of the sub-file 410 within the data file 402. The previous locations of a sub-file 410 may be tracked, for example, by creating additional entries in the log 404 pointing to the data block or blocks 406 corresponding to the previous locations. This functionality may be useful, for example, to comply with regulatory requirements.

It will be appreciated that implementing the log-structured file system within a data file 402 may, for example, provide, a highly flexible method for adding functionality to an existing file system or file systems in an operating system so that such features can be made generally available to all applications without requiring any modifications to the applications.

Figure 5:
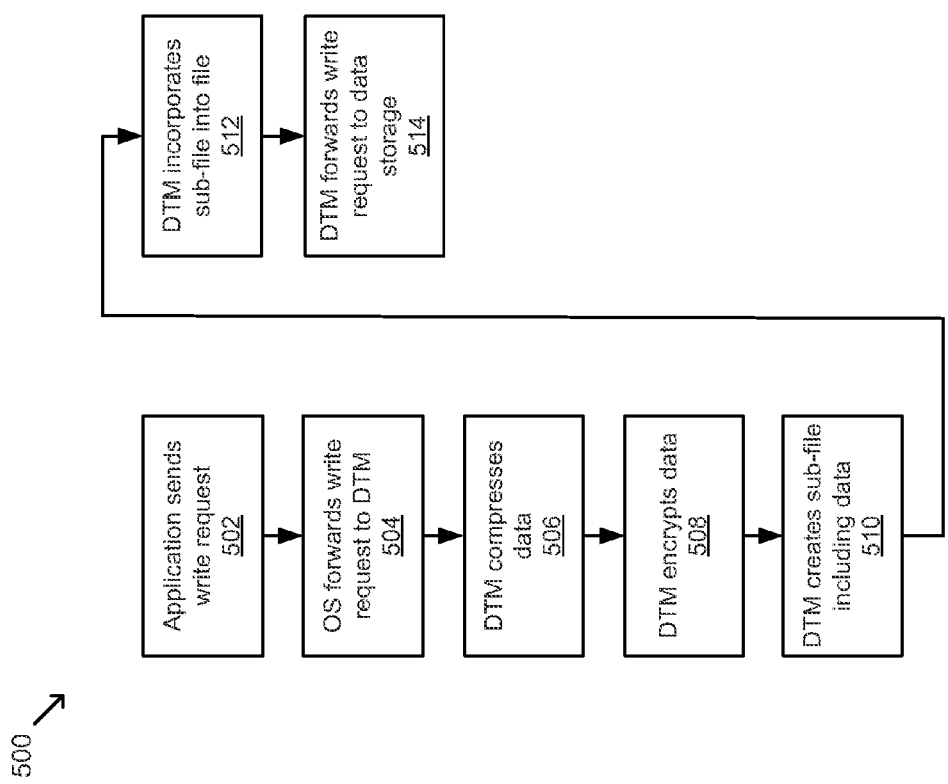
FIG. 5 shows a flow chart of a process flow according to various embodiments.

FIG. 5 shows a flowchart illustrating a process flow 500 for writing data to data storage 210 according to various embodiments, for example, utilizing the architecture 300. At step 502, the application 202 may originate a write request. The write request may include a data unit that may have been modified by the application 202, and may be directed towards the operating system 206, for example, through library 204. At step 504, the operating system 206 may receive the write request and forward it to the data transformation module 302.

The data transformation module 302 may compress the data unit at step 506 according to any suitable compression scheme. Non-limiting examples of compression schemes that may be used by the data transformation module 302 include lossless compression schemes such as the Lempel-Ziv-Welch dictionary based compression technique, run-length encoding schemes, etc., as well as lossy compression schemes, such as the Joint Photographic Experts Group scheme (JPEG), a Moving Pictures Experts Group scheme (MPEG), etc. It will be appreciated that it may be advantageous for the data transformation module 302 to compress the data unit at step 506 before encryption because the results of many encryption algorithms are highly random, making subsequent compression difficult.

At step 508, the data transformation module 302 may encrypt the data according to any suitable encryption scheme, algorithm, or device including, for example, DES schemes, schemes based on the US National Institute of Standards and Technology (NIST) Data Encryption Standard, schemes based on the Advanced Encryption Standard, and/or other schemes, such as the Lucifer encryption scheme from IBM, public key encryption schemes, etc. In various embodiments, the data transformation module 302 may utilize encryption hardware 304 to encrypt and decrypt data.

It will be appreciated that in various non-limiting embodiments, the data transformation module 302 may perform various other data transformations in addition to, or instead of, the compression and encryption described with reference to process flow 500. For one non-limiting example, the data transformation module 302 may perform any kind of data transformation, including data transformations that tend to change the original size of a data unit. Additional non-limiting examples of data transformations that may be performed by the data transformation module 302 include translation from a first language to a second language, (e.g., English to French), transformation from a first data format to a second data format, (e.g., ASCII data to UNICODE data), the addition of a digital signature, provisions for supporting sparse files, allowing support for extended attributes, property lists, alternate data streams, transactions, etc.

At step 510, the data transformation module 302 may format the data unit into a sub-file 410 and at step 512, may incorporate the sub-file 410 into the data file 402. For example, the data transformation module 302 may write the sub-file to the next available data block 406 of the data file 402 and update the log 404 to associate the sub-file 410 with the data block 406 where it is located. The data file 402 itself may then be stored at data storage 210, for example, through the file system 208 at step 514. It will be appreciated that if a write-behind method is in use, the data file 402 may be written to data cache 212 instead of being immediately written to data storage 210. Data files including data file 402 may then be written to data storage 210 according to the write-behind method.

Figure 6:
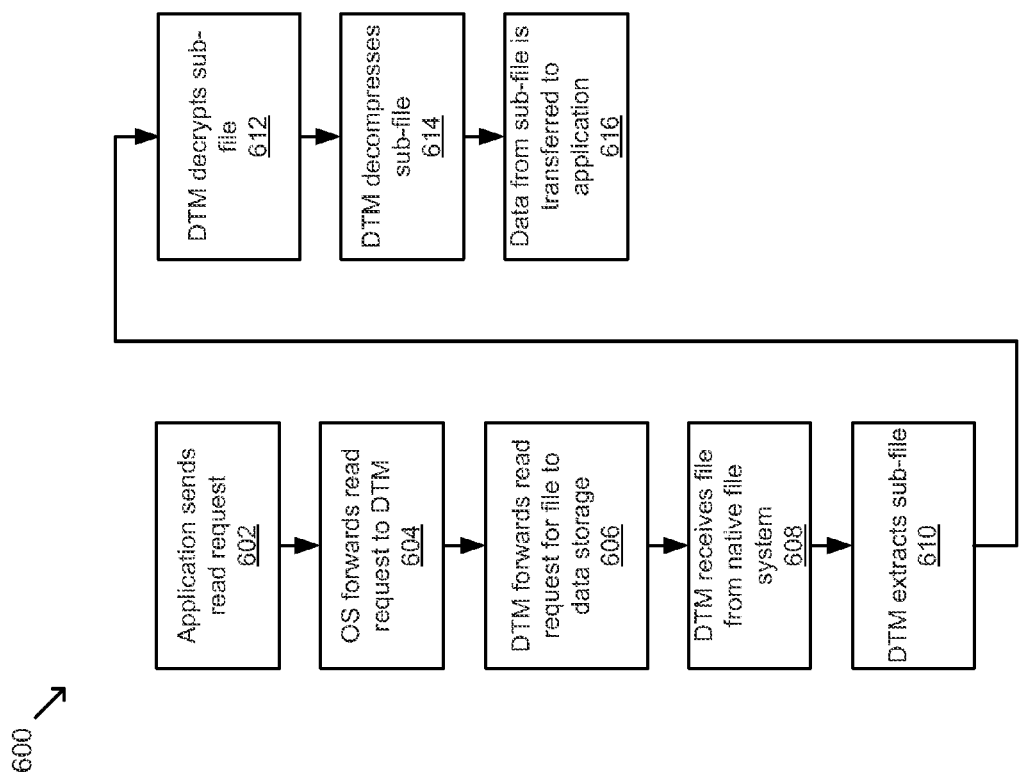
FIG. 6 shows a flow chart of a process flow according to various embodiments.

FIG. 6 shows a flowchart illustrating a process flow 600 for reading data from data storage 210 according to various embodiments, for example, utilizing the architecture 300. At step 602, the application may send a read request that may identify a data unit that application 202 intends to access. At step 604, the operating system 206 may forward the read request to the data transformation module 302. The data transformation module 302 may identify the sub-file 410 including the named data unit as well as the data file 402 containing the sub-file 410. The data transformation module 302 may then request the appropriate data file 402 from the file system 208. The file system 208 may return the data file 402 to the data transformation module 302 at step 608. It will be appreciated that if a read-ahead method is being implemented, then the data file 402 may be forwarded to the data transformation module 302 from data cache 212 rather than from data storage 210.

When it has received the data file 402, the data transformation module 302 may extract the sub-file 410 including the data unit originally requested by the application 202 at step 602. Extracting the sub-file 410 may include referring to the log 404 of the data file 402 to find the data block or blocks 406 including the sub-file 410 and extracting the sub-file 410 from the appropriate data block or blocks 406. When the sub-file 410 is extracted, the data transformation module 302 may decrypt the included data unit at 612 and decompress the data unit at 614. The data unit may then be forwarded to the application 202, for example, through the operating system 206.

Figure 7:
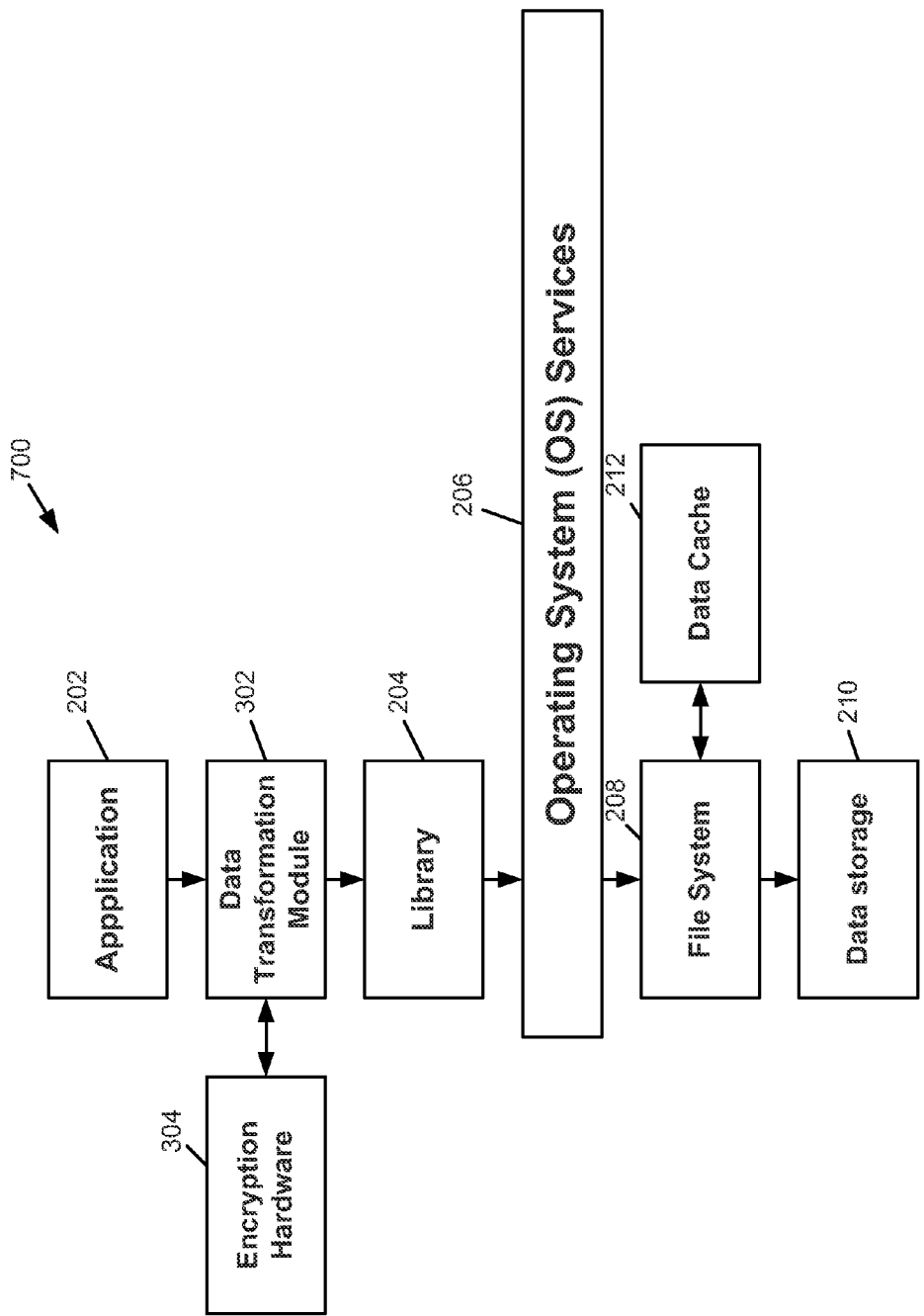
FIG. 7 shows a block diagram of a system architecture according to various embodiments.

In various embodiments, the functionality of the data transformation module 302 may be implemented at any point of the architectures 200, 300 between the application 202 and the data storage 210. It will be appreciated that the steps of the process flows 500 and 600 may be modified accordingly. For example, FIG. 7 shows a block diagram of a system architecture 700 with data transformation module 302 logically positioned between the application 202 and the operating system 206. In various embodiments, the functionality of the data transformation module 302 may be incorporated into the application 202 itself.

In various embodiments, files 402 including sub-files 410 may be copied and/or transmitted freely by computer devices 102, 104, 106, 108 regardless of whether the computer devices implement a data transformation module 302 or similar functionality. Computer devices 102, 104, 106, 108 without a data transformation module 302 or similar functionality, however, may not be able to read the files 402 and/or access the data units stored in sub-files 410.

It will be appreciated that transferability of files 402 including sub-files 410 may be exploited for various purposes. For example, it may be exploited to configure permissions to access data units within the computer system 100. Server 102 of the computer system 100 may include files 402 containing sub-files 410 according to the present disclosure. In various embodiments, the files 402 may be freely copied and transferred among the devices 102, 104, 106, 108, however, only devices 102, 104, 106, 108 implementing the functionality of the data transformation module 302 may be given the capability to access the sub-files 410 and included data units.

It is to be understood that the figures and descriptions of embodiments of the present invention have been simplified to illustrate elements that are relevant for a clear understanding of the present invention, while eliminating, for purposes of clarity, other elements, such as, for example, details of system architecture. Those of ordinary skill in the art will recognize that these and other elements may be desirable for practice of various aspects of the present embodiments. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It should be appreciated that figures presented herein are intended for illustrative purposes and are not intended as design drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

We claim:

1. A method for organizing data in a system comprising a data storage device and a host device, wherein the host device is programmed to execute an application; an operating system, a first file system for logically and physically organizing a plurality of data files on the data storage device, and a data transformation module logically positioned between the operating system and the first file system, the method comprising:
the application sending to the operating system a first write request indicating a logical grouping of at least one data unit;
the data transformation module receiving the first write request from the operating system;
the data transformation module organizing the logical grouping of the at least one data unit into a sub-file;
the data transformation module organizing the sub-file into a data file of the first file system according to a log-structured file system, wherein the log structured file system manages a logical and a physical organization of the sub-file within the data file; and the data transformation module transmitting a second write request to the first file system, the second write request requesting storage of the data file on the data storage device according to the first file system;

the data transformation module receiving a first read request identifying a second sub-file;

the data transformation module, in response to the first read request, identifying a second data file selected from the plurality of data files that comprises the second sub-file;

the data transformation directing a second read request to the first file system, wherein the second read request indicates the second data file;

the data transformation module receiving the second data file from the first file system in response to the second read request;

the data transformation module extracting the second sub-file from the second data file utilizing the log-structured file system; and the data transformation module returning the second sub-file in response to the first read request.

2. The method of claim 1, further comprising the transformation module performing an operation on the logical grouping of at least one data unit, wherein the operation changes the size of the at least one data unit.

3. The method of claim 2, wherein the operation is at least one of compression, encryption, translation from a first language to a second language, transformation from a first data format to a second data format, and translation from one encoding to a different encoding.

4. The method of claim 1, further comprising maintaining a previous version of the at least one data unit.

5. The method of claim 1, wherein the first file system is at least one of File Allocation Table 16 (FAT16), File Allocation Table 32 (FAT32), NTFS, High Performance File System (HPFS), UNIX file system (UFS), XFS, journaled file system (JFS), Universal Data Format File System (UDFS), CD-ROM File System (CDFS), Enhanced File System (EFS), SGI XFS, Clustered XFS (CXFS), HFS, VxFS, Raw File System (RawFS), and Local File System (DCE/LFS).

6. The method of claim 1, further comprising decrypting the second sub-file.

7. The method of claim 1, further comprising decompressing the second sub-file.

8. The method of claim 1, wherein the at least one data unit comprises a plurality of data units.

9. The method of claim 6, wherein the at least one data unit includes at least one of an encryption header, a thumbnail image, a checksum, and information indexing the data unit.

10. A system for storing data, the system comprising:
a data storage device;
a host device comprising at least one processor and associated memory, wherein the host device is in communication with the data storage device, and wherein the host device is programmed to execute:
an application programmed to send a first write request indicating a logical grouping of at least one data unit;
an operating system;
a first file system for logically and physically organizing a plurality of data files on the data storage device; and
a data transformation module logically positioned between the operating system and the first file system, wherein the data transformation module is programmed to implement within the first data file a log-structured file system for logically and physically organizing a plurality of sub-files within the first data file, and wherein the data transformation module is further programmed to:
receive the first write request;
organize the logical grouping of at least one data unit into a sub-file;
organize the sub-file into a second data file of the first file system according to the log-structured file system, wherein the log-structured file system manages a logical and a physical organization of the sub-file within the second data file;
transmit a second write request to the first file system for storage of the second data file on the data storage device according to the first file system;
receive a first read request specifying a first sub-file selected from the plurality of sub-files;
in response to the first read request, derive an indication of a first data file selected from the plurality of data files that comprises the first sub-file;
direct a second read request to the first file system, wherein the second read request indicates the first data file;
receive the first data file from the first file system in response to the second read request;
extract the first sub-file from the first data file utilizing the log-structured file system; and
return the first sub-file in response to the first read request.

11. The system of claim 10, wherein the data transformation is further programmed to, before organizing the sub-file into the second data file, perform a transformation on the sub-file that changes the size of the sub-file.

12. The system of claim 11, wherein the transformation comprises encryption.

13. The system of claim 11, wherein the transformation comprises compression.

14. The system of claim 11, wherein the transformation comprises a translation of the sub-file from a first human language to a second human language.

15. The system of claim 10, wherein the data storage device comprises the plurality of data files organized according to the first file system, wherein the plurality of data files comprises the first data file, and wherein the plurality of sub-files includes the first sub-file logically and physically organized within the first data file according to the log-structured file system.

16. The system of claim 10, wherein first file system defines a plurality of directories distinct from the plurality of data files, wherein the plurality of directories are for logically organizing the plurality of data files.

17. The system of claim 10, wherein the log-structured file system defines a second plurality of directories distinct from the plurality of sub-files, wherein the second plurality of directories are for logically organizing the plurality of sub-files within the first data file.

18. The system of claim 16, wherein the first file system defines a physical position of each of the plurality of data files on the storage device, and wherein the log-structured file system defines a physical position of each of the plurality of sub-files within the first data file.

19. The system of claim 10, wherein the first file system is a native file system of the operating system.

20. The system of claim 10, wherein the first file system is a native file system of the operating system.

* * * * *

UNITED STATES PATENT AND TRADEMARK OFFICE
CERTIFICATE OF CORRECTION

| | | Page 1 of 1 |
|---|---|---|
| PATENT NO. | : 8,521,752 B2 | |
| APPLICATION NO. | : 11/145433 | |
| DATED | : August 27, 2013 | |
| INVENTOR(S) | : W. Anthony Mason et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 446 days.

Signed and Sealed this
Tenth Day of February, 2015

Michelle K. Lee
*Deputy Director of the United States Patent and Trademark Office*